(12) United States Patent
He et al.

(10) Patent No.: US 10,344,812 B2
(45) Date of Patent: Jul. 9, 2019

(54) METHOD FOR PREVENTING INTERFERENCE BETWEEN TCU AND ESP

(71) Applicants: ZHEJIANG GEELY AUTOMOBILE RESEARCH INSTITUTE CO., LTD, Taizhou (CN); ZHEJIANG GEELY HOLDING GROUP CO., LTD, Hangzhou (CN)

(72) Inventors: Qiyu He, Taizhou (CN); Honglei Dong, Taizhou (CN); Jigang Jin, Taizhou (CN)

(73) Assignees: ZHEJIANG GEELY AUTOMOBILE RESEARCH INSTITUTE CO., LTD, Taizhou (CN); ZHEJIANG GEELY HOLDING GROUP CO., LTD, Hangzhou (CN)

(*) Notice: Subject to any disclaimer, the term of this patent is extended or adjusted under 35 U.S.C. 154(b) by 0 days.

(21) Appl. No.: 15/767,691

(22) PCT Filed: Oct. 13, 2016

(86) PCT No.: PCT/CN2016/101994
§ 371 (c)(1),
(2) Date: Apr. 12, 2018

(87) PCT Pub. No.: WO2017/063567
PCT Pub. Date: Apr. 20, 2017

(65) Prior Publication Data
US 2018/0306252 A1    Oct. 25, 2018

(30) Foreign Application Priority Data
Oct. 15, 2015   (CN) .......................... 2015 1 0673135

(51) Int. Cl.
F16D 48/06    (2006.01)
G05B 19/04    (2006.01)
G06F 13/20    (2006.01)

(52) U.S. Cl.
CPC ............. *F16D 48/06* (2013.01); *G05B 19/04* (2013.01); *G06F 13/20* (2013.01); *F16D 2500/1045* (2013.01); *F16D 2500/50833* (2013.01)

(58) Field of Classification Search
None
See application file for complete search history.

(56) References Cited

U.S. PATENT DOCUMENTS 5,168,955 A    12/1992  Naito
9,637,126 B2*   5/2017  Kikuyama ............. B60L 15/20
(Continued)

FOREIGN PATENT DOCUMENTS

CN    103204164 A    7/2013
CN    103266956 A    8/2013
(Continued)

OTHER PUBLICATIONS

International Search Report and Written Opinion Application No. PCT/CN2016/101994, dated Dec. 29, 2016, 14 pages.
(Continued)

*Primary Examiner* — Dirk Wright
(74) *Attorney, Agent, or Firm* — Alston & Bird LLP

(57) ABSTRACT

A method for preventing interference between a transmission control unit (TCU) and an electronic stability program (ESP). The method comprises: a splitting step: split signals of an ESP and a traction control system (TCS), so that the TCU can learn whether the TCS is in a control state; and a detection and control step: the TCU independently detects split signals of the ESP and the TCS, and when detecting that
(Continued)

the TCS is in the control state, the TCU suspends the active sending of a torque decrease request of the TCU to the ECU. In this way, mutual interference between a TCU and a TCS is avoided, and problems of vehicle jitter, vehicle locking, excessively rapid vehicle-speed decreasing, and excessively rapid hardware damage of a clutch are resolved.

9 Claims, 7 Drawing Sheets

(56) References Cited

U.S. PATENT DOCUMENTS

2014/0350799 A1 11/2014 Kikuyama et al.
2018/0060262 A1* 3/2018 Kim ...................... G06F 13/102

FOREIGN PATENT DOCUMENTS

| CN | 103498879 A | 1/2014 |
| CN | 104136269 A | 11/2014 |
| CN | 105259804 A | 1/2016 |
| CN | 105276168 A | 1/2016 |
| KR | 20100056942 A | 5/2010 |

OTHER PUBLICATIONS

Office Action for corresponding Chinese Application No. 201510673135.9 dated May 27, 2017 with English Translations, 8 pages.
Search Report for corresponding Chinese Application No. 2015106731359 dated May 17, 2017, 2 pages.

* cited by examiner

METHOD FOR PREVENTING INTERFERENCE BETWEEN TCU AND ESP

CROSS-REFERENCE TO RELATED APPLICATIONS

This application is a national phase entry of International Application No. PCT/CN2016/101994, filed Oct. 13, 2016, which claims priority to Chinese Patent Application No. 201510673135.9, filed on Oct. 15, 2015, the entire contents of which are incorporated herein by reference.

TECHNICAL FIELD

The present invention relates to the field of vehicle control, and in particular to a method for preventing interference between a TCU and an ESP.

BACKGROUND OF THE INVENTION

Vehicles with an ESP (Electronic Stability Program) generally incorporate a TCS (Traction Control System) function. The inventors have found that, in vehicles with the ESP and a TCU (Transmission Control Unit), there will be problems of vehicle jitter, vehicle locking, excessively rapid vehicle-speed decreasing, and excessively rapid hardware damage of a clutch under certain operating conditions.

SUMMARY OF THE INVENTION

The objectives of the present invention is to find the reason why the above-mentioned problems occur to a vehicle with an ESP and a TCU and to provide a method for solving the above-mentioned problems.

In particular, the present invention provides a method, wherein the method is used for preventing interference between a TCU and an ESP integrated with a TCS, the method comprising:

a splitting step: splitting signals of the ESP and the TCS, so that the TCU can learn about whether the TCS is in a control state;

and a detection and control step: the TCU independently detecting the splitted signals of the ESP and the TCS, and when detecting that the TCS is in the control state, the TCU suspending the active sending of a torque reduction request of its own to an ECU.

Further, the control state is a TCS-activated state; and the splitting step comprises: splitting state signals and failed signals of the ESP and the TCS.

Further, the control state is a TCS torque reduction request-activated state; and the splitting step comprises: splitting torque reduction request signals of the ESP and the TCS.

Further, the detection and control step comprises:

when determining that the TCS is activated if detecting the state signals of the TCS, the TCU stopping the sending of the torque reduction request.

Further, the detection and control step further comprises:

when determining that the ESP fails if detecting the failed signals of the ESP, and determining that the TCS fails if detecting the failed signals of the TCS, the TCU then being able to send the torque reduction request of the TCU according to control requirements of a transmission.

Further, the detection and control step comprises the following steps:

step 1: the TCU determining whether there is a torque reduction requirement for the transmission, and if so, entering step 2;

step 2: the TCU determining, depending on whether the failed signals of the TCS are detected, whether the TCS fails, if so, entering step 4, and if not, entering step 3;

step 3: the TCU determining, depending on whether the state signals of the TCS are received, whether the TCS is in the TCS-activated state, if not, entering step 4, and if so, the TCU not sending the torque reduction request and returning to step 1; and step 4: the TCU sending the torque reduction request.

Further, when determining that the TCS torque reduction request is activated if detecting the torque reduction request signals of the TCS, the TCU suspends the active sending of the torque reduction request of its own to the ECU; and when determining that the TCS torque reduction request is not activated if the torque reduction request signals of the TCS are not detected, the TCU sends the torque reduction request according to the control requirements of the transmission.

Further, the detection and control step comprises the following steps:

step 1: the TCU determining whether there is a torque reduction requirement for the transmission, if so, entering step 2, and if not, repeating step 1;

step 2: the TCU determining, depending on whether the torque reduction request signals of the TCS are detected, whether there is a torque reduction request for the TCS, if so, entering step 3, and if not, entering step 4;

step 3: the TCU not sending the torque reduction request; and step 4: the TCU sending the torque reduction request.

Further, the TCU communicates with the ESP via a CAN bus.

Further, the ESP sends out a gearshift inhibit request signal, an ESP state signal, an ESP fail signal, and a torque decrease request signal via a CAN bus.

Further, the state signals of the ESP comprise: an ESP state signal and a TCS state signal;

the failed signals of the ESP comprise: an ESP failed signal and a TCS failed signal; and the torque reduction request signals comprise: an ESP torque reduction request signal, a TCS torque reduction request signal, an ESP torque reduction request activated signal and a TCS torque reduction request activated signal.

In the present invention, signals of the ESP and the TCS are split, so that the TCU can learn about whether the TCS is in a control state, and when detecting that the TCS is in the control state, the TCU suspends the active sending of a torque reduction request of its own to the ECU. In this way, mutual interference between a TCU and a TCS is avoided, and the problems of vehicle jitter, vehicle locking, excessively rapid vehicle-speed decreasing, and excessively rapid hardware damage of a clutch are solved. As for specific principles, it is referred to the description of the embodiment part.

According to the detailed description of specific embodiments of the present invention below in conjunction with the accompanying drawings, the above and other purposes, advantages and features will become more apparent for a person skilled in the art.

Figure 1:
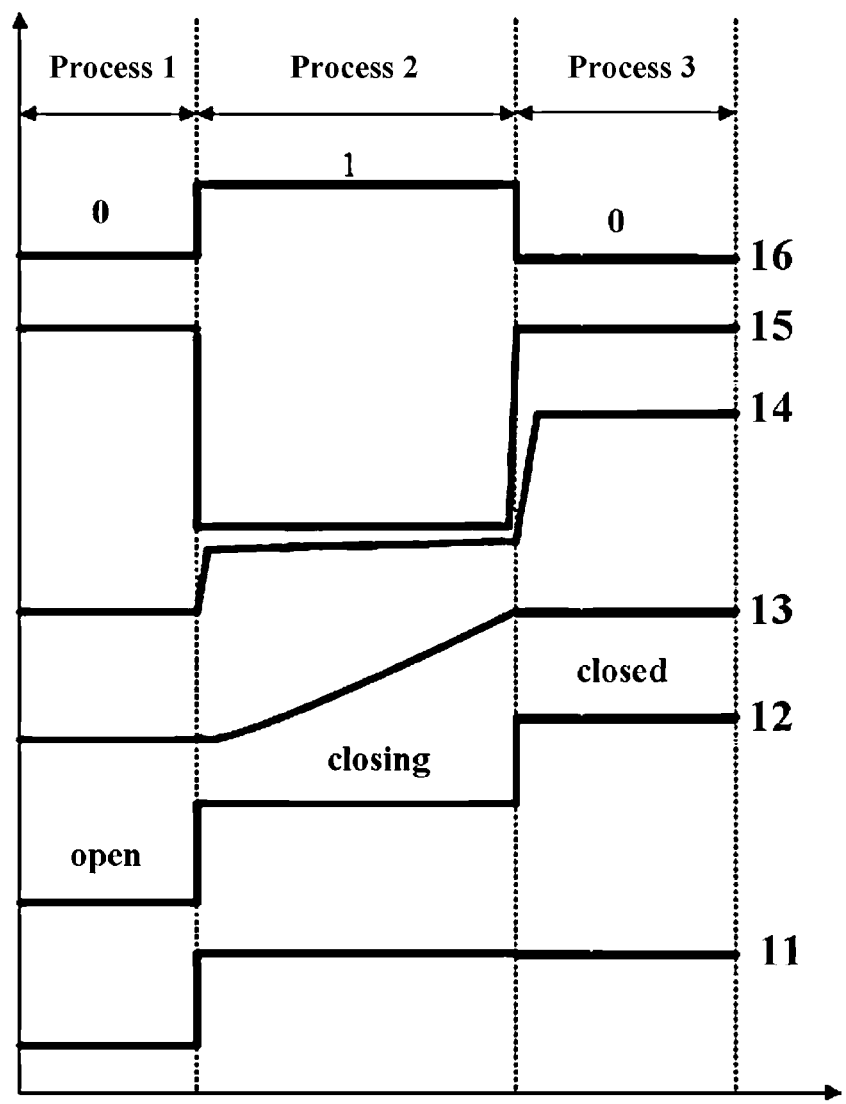
FIG. 1 is a schematic diagram of a normal engagement process of a clutch in the prior art.

Unless otherwise specified, the following terms refer hereinafter to:

ESP: Electronic Stability Program;
TCS: Traction Control System;
TCU: Transmission Control Unit;
ECU: Electronic Control Unit;
CAN: Controller Area Network;
gearshift inhibit request: requiring the TCU to maintain the current gear to prevent a sudden change of the torque on a wheel end due to gearshift;
torque reduction request: requiring the ECU to reduce an output torque to a set value; and
low-adhesion road: road with low adhesion, such as wet ground in rainy and snowy days as well as sand and other grounds.

DETAILED DESCRIPTION OF THE INVENTION

As mentioned in the background art, in vehicles with an ESP and a TCU, there will be problems of vehicle jitter, vehicle locking, excessively rapid vehicle-speed decreasing, and excessively rapid hardware damage of a clutch. The inventors have found through researches that since the ESP is integrated with a TCS, when the TCS is activated, a torque reduction request is issued to an ECU (Electronic Control Unit). For automatic vehicles, when the transmission is in the operating conditions of vehicle starting, clutch engagement, TCU will issue a torque reduction request to the ECU, and there is the risk of mutual interference between the TCU and the TCS. In general, the method of the present invention independently detects the TCS by means of the TCU, and suspends, when the TCS is activated, sending the torque reduction request, thereby avoiding the interference with the working of the TCS, and optimizing the joint control between the TCU and TCS of an automatic transmission.

In summary, the ESP and TCS torque reduction requests in the prior art: when the ESP is activated, a gearshift inhibit request is sent to the TCU, and the TCU responds to the request according to the actual operating conditions. This is the unique collaborative control of the transmission control unit (TCU) and ESP over a vehicle in the prior art. But in fact, the ESP and the TCS integrated within the ESP have different control logics for the vehicle: the ESP mainly detecting the side slipping and deviation of the vehicle, and when the vehicle body is in an unstable operating condition, the ESP taking different degrees of braking on the wheels, so that the vehicle body maintains balance. At the same time, the ESP sends a gearshift inhibit request to prevent transmission shifting from changing the torque on the wheel end, in order to ensure the control precision of the ESP. At this moment, the transmission does not shift, and the TCU does not send a torque reduction request, without interfering with the torque reduction request of the ESP. The TCS detects a driving wheel, and when the driving wheel slips, the TCS sends a torque reduction request to the ECU while controlling a braking force of the driving wheel, so that the ECU reduces an output torque of the engine. In addition, the TCS sends a gearshift inhibit request to prevent transmission gearshift from changing the torque on the wheel end, in order to ensure the control precision of the TCS. TCS activation usually occurs at the starting of a large throttle or starting on a low-adhesion road. Specifically, the TCU torque reduction request in the prior art: the automatic transmission control unit (TCU) also sending a torque reduction request to the ECU under certain operating conditions to achieve hardware protection and optimize the control effect. For an automatic transmission of a hydraulic torque converter style, such as a sequential automatic transmission (AT), the TCU will send a torque reduction request during gearshift. In addition, the TCU will also send a torque reduction request to protect transmission hardware when the output torque of the engine exceeds a carrying torque of the transmission; for an automatic transmission of a clutch style, such as a dual-clutch automatic transmission (DCT) and an automated manual transmission (AMT), when the vehicle starts, it needs to go through the engagement of clutch, and thus also sends a torque reduction request when the vehicle starts. For a continuously variable transmission (CVT), in addition to the above-mentioned two transmissions, the TCU will send the torque reduction request under special operating conditions such as wheel slipping, wheel locking and bumpy road, so as to protect the steel belt or chain. Therefore, it can be concluded that under certain operating conditions, the TCU and the TCS will simultaneously send a torque reduction request to the ECU, resulting in mutual interference. Normally, the ECU only responds to a torque reduction request with a lower set value, thus affecting another control. The above-mentioned findings were achieved by the inventors after careful researches and hard-working efforts.

From the aspect of signals, in the prior art, there is only one state signal, one failed signal and one torque reduction signal of an ESP:

ESP_GearShiftInhibit: gearshift inhibit signal;
ESP_Active: ESP_active signal;
ESP_Failed: ESP_Failed signal;
ESP_TorqueReductionRequestActive: ESP torque reduction request active; and
ESP_TorqueReductionRequest: ESP torque reduction request.

This kind of setting causes that as long as either ESP or TCS is activated, the ESP_Active signal is set to "1", indicating an open state. Similarly, as long as either ESP or TCS fails, the ESP_Failed signal is set to "1", indicating an open state. Moreover, the torque reduction requests of the ESP and the TCS are also sent by means of the same signal. The TCU cannot distinguish whether the TCS is activated, therefore, the TCU sends the torque reduction request only according to the control requirements of the transmission, which inevitably leads to the interference with TCS control.

In the present invention, the TCU and the ESP are designed to perform communication via a CAN bus, and as described above, the gearshift inhibit request of the ESP is signalled to the TCU via the CAN bus. Similarly, the ESP will send state signals, a failed signals and a torque reduction request to the CAN bus. The state signals of the ESP comprise: an ESP state signal and a TCS state signal; the failed signals of the ESP comprise: an ESP failed signal and a TCS failed signal; and the torque reduction request signals comprise: an ESP torque reduction request signal, a TCS torque reduction request signal, an ESP torque reduction request active signal and a TCS torque reduction request active signal.

The splitting step of the present invention involves: splitting signals of the ESP and the TCS, so that the TCU can learn about whether the TCS is in a control state. The detection and control step of the present invention involves: the TCU independently detecting the split signals of the ESP and the TCS, and when detecting that the TCS is in the control state, the TCU suspending the active sending of a torque reduction request of its own to the ECU. In this way, mutual interference between a TCU and a TCS is avoided, and the problems of vehicle jitter, vehicle locking, excessively rapid vehicle-speed decreasing, and excessively rapid hardware damage of a clutch are solved.

The technical effects brought by the present invention will be illustrated below by means of comparison.

FIG. 1 is a schematic diagram of a normal engagement process of a clutch in the prior art, in which:
curve 11: accelerator pedal opening;
curve 12: clutch state, wherein open refers to clutch opening, closing refers to a clutch engagement process, and closed refers to clutch engaged;
curve 13: clutch pressure;
curve 14: engine torque;
curve 15: TCU torque reduction request signal; and
curve 16: TCU torque reduction request active signal.

As shown in FIG. 1, in a normal starting process (wheels do not slip, and a TCS does not operate), the TCU controls the clutch pressure, causing the engagement of the clutch, and the process is described as follows:

process 1: the vehicle keeping standstill on the spot, and the clutch (curve 12) being in an open state (open) at this moment Process 2: a driver presses down an accelerator (curve 11) and the vehicle starts. The clutch pressure increases (curve 13), and the clutch begins to engage (curve 12, closing). At this time, the TCU triggers the torque reduction request active signal (curve 16), and the TCU starts to send the torque reduction request (curve 15). The ECU controls the engine torque according to the TCU torque reduction request (curve 14)

Process 3: the vehicle continues to accelerate and the clutch completes the engagement (curve 12, closed), and the TCU cancels the torque reduction request active signal (curve 16) and stops sending the torque reduction request (curve 15). The engine torque (curve 14) is no longer affected by the TCU torque reduction request.

It should be noted that, in the prior art, when the TCU and the TCS simultaneously send a torque reduction request, the ECU only responds to a request with a smaller torque reduction value, thereby affecting vehicle control.

Figure 2:
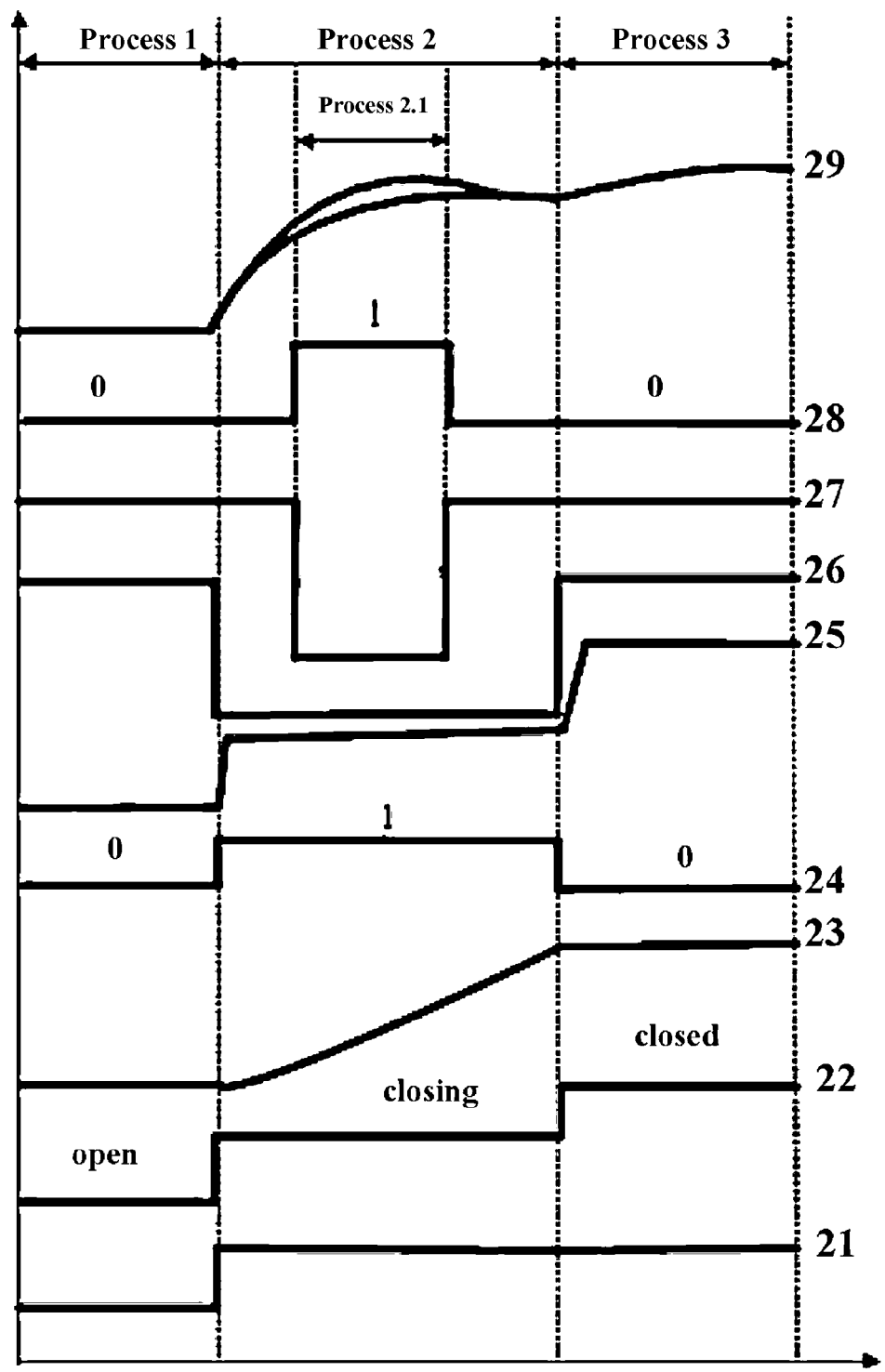
FIG. 2 is a schematic diagram that a TCS torque reduction request value is higher than a TCU torque reduction request value in the prior art.

FIG. 2 is a schematic diagram of a TCS torque reduction request value being higher than a TCU torque reduction request value in the prior art, in which:
curve 21: accelerator pedal opening;
curve 22: clutch state, wherein open refers to clutch opening, closing refers to a clutch engagement process, and closed refers to clutch engaged;
curve 23: clutch pressure;
curve 24: TCU torque reduction request active signal;
curve 25: engine torque;
curve 26: TCU torque reduction request;
curve 27: TCS torque reduction request;
curve 28: TCS state, where 1 indicates active, and 0 indicates inactive; and
curve 29: ABS wheel speed signal, wherein the wheel speed refers to that of a driving wheel and a driven wheel.

As shown in FIG. 2, when a TCS torque reduction request value is higher than a TCU torque reduction request value, the process is described as follows:

process 1: the vehicle keeping standstill on the spot, and the clutch (curve 22) being in an open state (open) at this moment Process 2: a driver presses down an accelerator (curve 21) and the vehicle starts. The clutch pressure increases (curve 23), and the clutch begins to engage (curve 22). At this time, the TCU triggers the torque reduction request active signal (curve 24), and the TCU starts to send the torque reduction request (curve 26). The ECU controls the engine torque (curve 25) according to the TCU torque reduction request. At this moment, due to the slipping of the driving wheel of the vehicle, the speed of the driving wheel begins to be deviated from a rotational speed of the driven wheel, and it is obviously shown in FIG. 2 that the rotational speed of the driving wheel is higher than the rotational speed of the driven wheel.

Process 2.1: when the rotational speed of the driving wheel and the rotational speed of the driven wheel are too high, the function of the TCS is activated (curve 28, ESP_TCSActive=1) and the TCS starts to send the torque reduction request (curve 27). Assuming that the TCS torque reduction request value is higher than the TCU torque reduction request value (curve 26), the ECU will continue to control the engine torque (curve 25) according to the TCU torque reduction request since the TCU torque reduction request is lower. Therefore, the engine torque (curve 25) is smaller than the torque required for TCS control, resulting in excessive braking force applied by the TCS to the driving wheel, and the rotational speed of the driving wheel declines too fast (curve 29), and the braking feeling is too strong, causing vehicle jitter and affecting the driving comfort. On the other hand, on wet road, the braking force of the driving wheel is too large, and wheel locking and out of control of a vehicle are also easily caused. After the rotational speed of the driving wheel approaches the rotational speed of the driven wheel (curve 29), the TCS exits the control (curve 28, ESP_TCSActive=0).

Process 3: the vehicle continues acceleration and the clutch completes the engagement (curve 22), and the TCU cancels the torque reduction request active signal (curve 24) and stops sending the torque reduction request (curve 26). The engine torque (curve 25) is no longer affected by the TCU torque reduction request.

Figure 3:
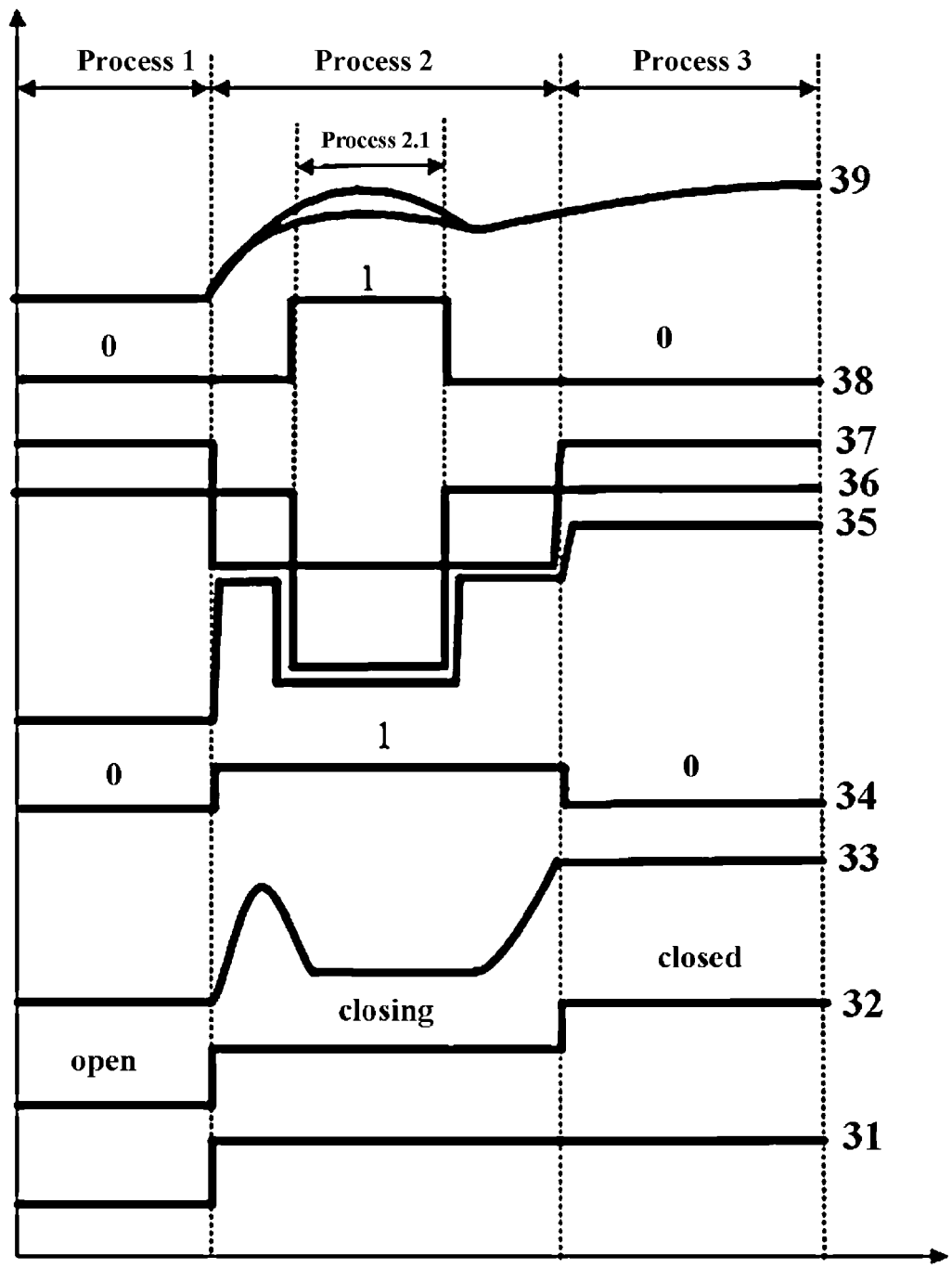
FIG. 3 is a schematic diagram that a TCS torque reduction request value is less than a TCU torque reduction request value in the prior art.

FIG. 3 is a schematic diagram of a TCS torque reduction request value being smaller than a TCU torque reduction request value in the prior art, in which:
curve 31: accelerator pedal opening;
curve 32: clutch state, wherein open refers to clutch opening, closing refers to a clutch engagement process, and closed refers to clutch engaged;
curve 33: clutch pressure;
curve 34: TCU torque reduction request active signal;
curve 35: engine torque;
curve 36: TCS torque reduction request;
curve 37: TCU torque reduction request;
curve 38: TCS state, where 1 indicates active, and 0 indicates inactive; and
curve 39: ABS wheel speed signal, wherein the wheel speed refers to that of a driving wheel and a driven wheel.

As shown in FIG. 3, when a TCS torque reduction request value is smaller than a TCU torque reduction request value, the process is described as follows:

process 1: the vehicle keeping standstill on the spot, and the clutch (curve 32) being in an open state (open) at this moment Process 2: a driver presses down an accelerator (curve 31) and the vehicle starts. The clutch pressure increases (curve 33), and the clutch begins to engage (curve 32). At this time, the TCU triggers the torque reduction request active signal (curve 34), and the TCU starts to send the torque reduction request (curve 37). The ECU controls the engine torque (curve 35) according to the TCU torque reduction request. At this moment, due to the slipping of the driving wheel of the vehicle, the speed of the driving wheel begins to be deviated from a rotational speed of the driven wheel.

Process 2.1: when the rotational speed of the driving wheel and the rotational speed of the driven wheel are too high, the function of the TCS is activated (curve 38, ESP_TCSActive=1) and the TCS starts to send the torque reduction request (curve 36). It is assumed that the TCS torque reduction request value (curve 6) is lower than the TCU torque reduction request value (curve 37). Since the TCS torque reduction request is lower, the ECU will control the engine torque (curve 35) according to the TCS torque reduction request. Therefore, the engine torque (curve 35) is smaller than the torque required for TCU control, and since the TCU controls the clutch pressure based on the engine torque, the clutch pressure (curve 33) is forced to decrease with the engine torque (curve 35). As a result, the clutch cannot engage and the speed of the vehicle also rapidly decreases therewith, thereby affecting comfort. On the other hand, the clutch is in a slippery state for a long time, a large amount of heat is generated, which may cause the damage of the clutch in a severe case. After process 2.1, when the rotational speed of the driving wheel approaches the rotational speed of the driven wheel (curve 39), the TCS exits the control (curve 38, ESP_TCSActive=0), and the clutch continues to complete the engagement process.

Process 3: the vehicle continues acceleration and the clutch completes the engagement (curve 32), and the TCU cancels the torque reduction request active signal (curve 34) and stops sending the torque reduction request (curve 37). The engine torque (curve 35) is no longer affected by the TCU torque reduction request.

Figure 4:
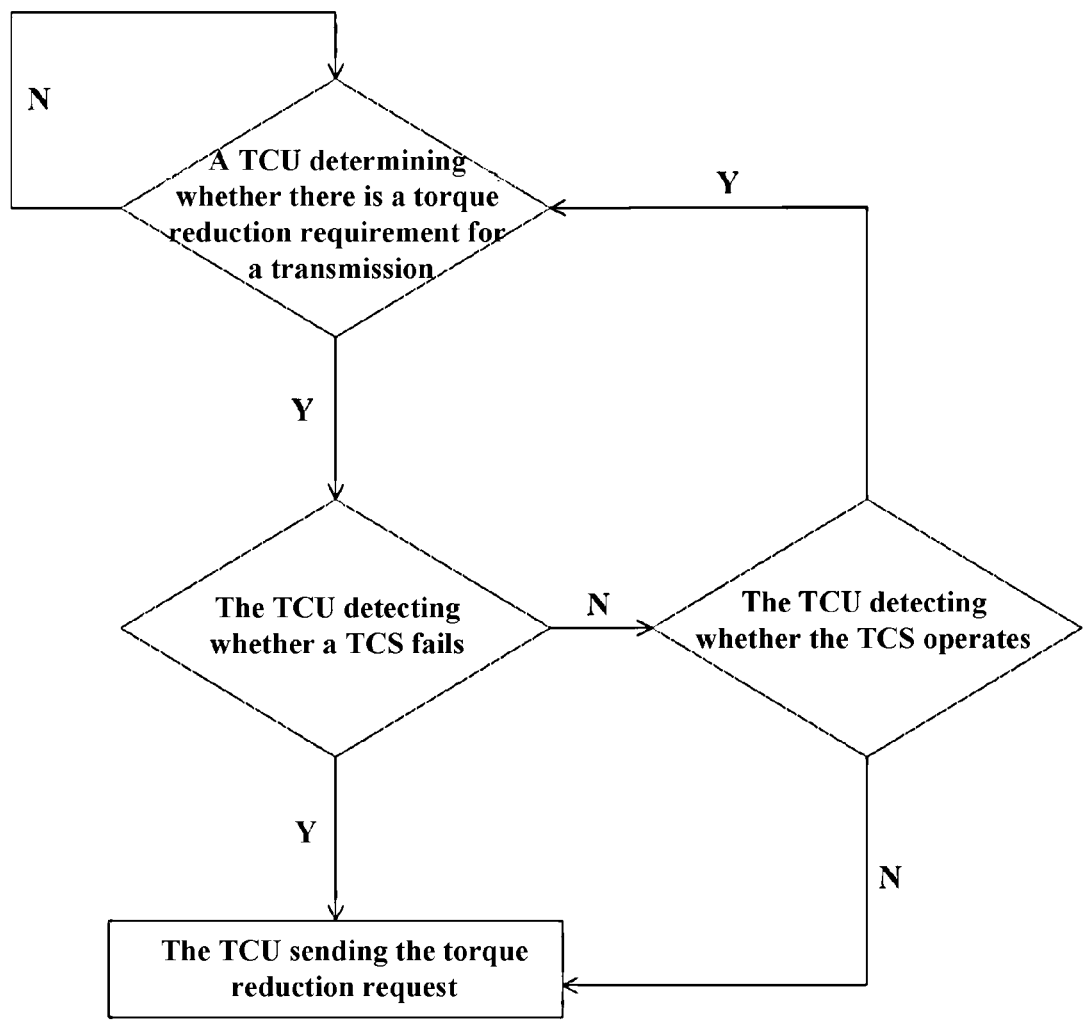
FIG. 4 is a method flowchart of one embodiment of the present invention.

A method embodiment of the present invention shown in FIG. 4 is based on the following conception: the TCU independently responding to the TCS by splitting the ESP state signal. The ESP control unit splits the state signal and the failed signal, that is, the ESP control unit respectively sends the state and failed signals of the ESP and the TCS:

ESP_ESPActive: ESP active signal;
ESP_TCSActive: TCS active signal;
ESP_ESPFailed: ESP failed signal;
ESP_TCSFailed: TCS failed signal;

The TCU monitors the state of the TCS, and when determining that the TCS is in the control state if detecting the TCS is activated (ESP_TCSActive=1), the TCU stops sending the torque reduction request to avoid the interference with the TCS. TCS control ends (ESP_TCSActive=0), and the TCU continues to send the torque reduction request. At the same time, the TCU monitors the TCS and ESP failed signals. If only detecting that the ESP fails (ESP_ESPFailed), the TCU still monitors the TCS state to avoid the interference with the TCS. If it is detected that the TCS fails (ESP_TCSFailed=1), it is considered that the TCS cannot operate normally, and the TCU may send the TCU torque reduction request according to the control requirements of the transmission.

At this moment, the detection and control step comprises the following steps:

step 1: the TCU determining whether there is a torque reduction requirement for the transmission, and if there is a torque reduction request, entering step 2;

step 2: the TCU detecting whether the TCS fails, if the TCS fails (ESP_TCSFailed=1), entering step 4, and the TCU being able to send the torque reduction request, and if the TCS does not fail (ESP_TCSFailed=0), entering step 3;

step 3: the TCU detecting whether the TCS operates, if the TCS does not operate (ESP_TCSActive=0), then entering step 4, and the TCU being able to send the torque reduction request, and if the TCS operates (ESP_TCSActive=1), the TCU being not able to send the torque reduction request, and returning to step 1;

and step 4: the TCU sending the torque reduction request.

Figure 5:
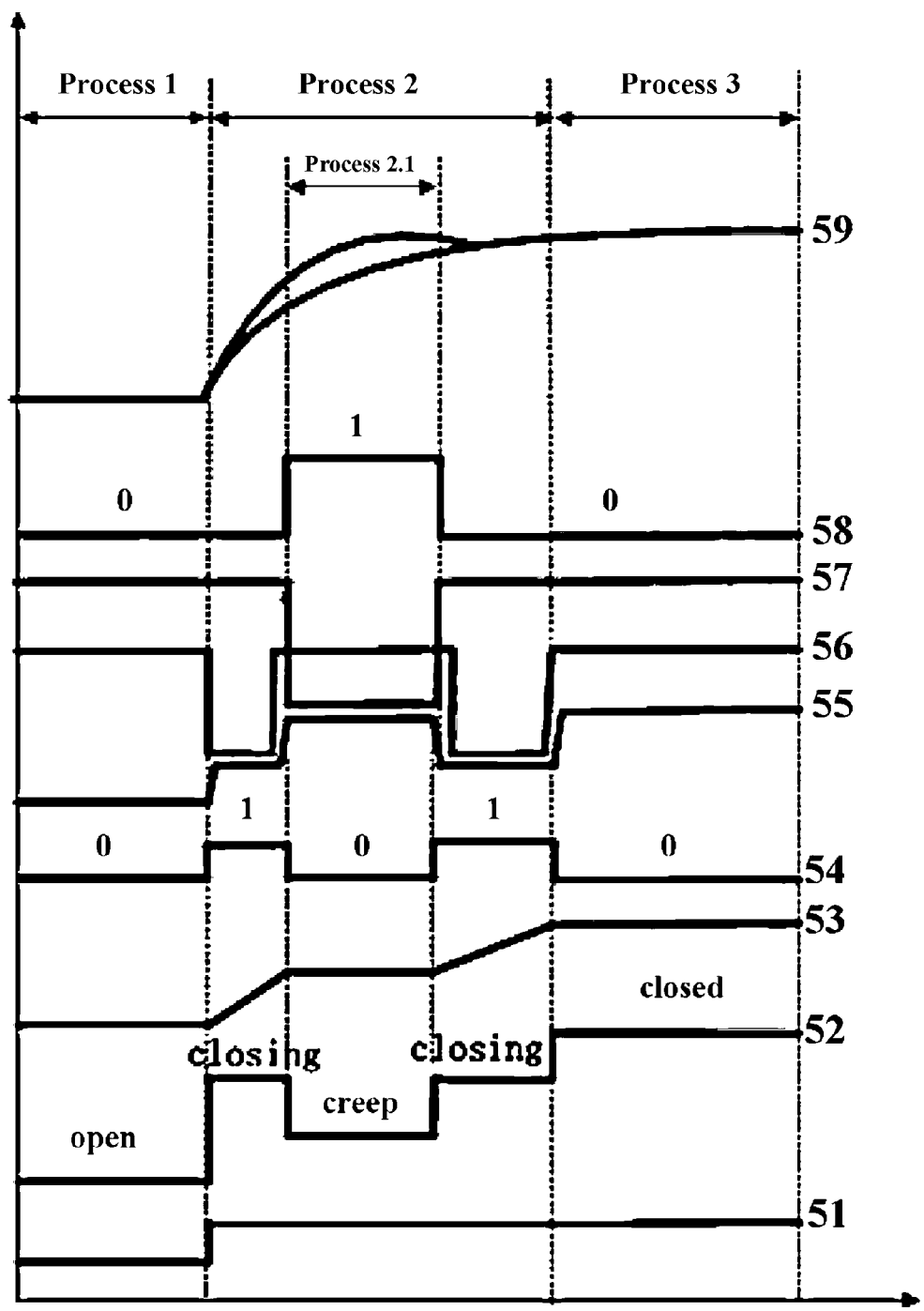
FIG. 5 is a schematic diagram of a starting process of a big throttle on wet road when the method shown in FIG. 4 is applied to a CVT transmission.

FIG. 5 is a schematic diagram of a starting process of a big throttle on wet road when the method shown in FIG. 4 is applied to a CVT transmission, in which:

curve 51: accelerator pedal opening;
curve 52: clutch state, wherein open refers to clutch opening, closing refers to a clutch engagement process, closed refers to clutch engaged, and creep refers to an idling sliding state;
curve 53: clutch pressure;
curve 54: TCU torque reduction request active signal;
curve 55: engine torque;
curve 56: TCU torque reduction request;
curve 57: TCS torque reduction request;
curve 58: TCS state, where 1 indicates active, and 0 indicates inactive; and
curve 59: ABS wheel speed signal (a driving wheel and a driven wheel).

As shown in FIG. 5, a starting process of a large throttle of a CVT transmission on wet road is taken as an example:

process 1: the vehicle keeping standstill on the spot, and the clutch (curve 52) being in an open state (open) at this moment Process 2: a driver presses down an accelerator (curve 51) and the vehicle starts. The clutch pressure increases (curve 53), and the clutch begins to engage (curve 52). At this time, the TCU triggers the torque reduction request active signal (curve 54), and the TCU starts to send the torque reduction request (curve 56). The ECU controls the engine torque (curve 55) according to the TCU torque reduction request. At this moment, due to the slipping of the driving wheel of the vehicle, the speed of the driving wheel begins to be deviated from a rotational speed of the driven wheel.

Process 2.1: when the rotational speed of the driving wheel and the rotational speed of the driven wheel are too high, the function of the TCS is activated (curve 58, ESP_TCSActive=1) and the TCS starts to send the torque reduction request (curve 57). When detecting that the TCS operates, the TCU interrupts the TCU torque reduction request active signal (curve 54), stops sending the TCU torque reduction request (curve 56), suspends the clutch engagement process, and maintains in the creep state (curve 52), thus ensuring that a certain torque is delivered to the wheel. At this moment, the ECU controls the engine torque (curve 55) according to the TCS torque reduction request (curve 57). After process 2.1, the difference of the rotational speeds between the driving wheel and the driven wheel (curve 59) decreases and the TCS stops operating (curve 8, ESP_TCSActive=0). When detecting that the TCS stops operating, the TCU can continue to activate the torque reduction request (curve 54), send the torque reduction request (curve 56) and continue the clutch engagement process (curve 52).

Process 3: the vehicle continues acceleration and the clutch completes the engagement (curve 52), and the TCU cancels the torque reduction request active signal (curve 54) and stops sending the torque reduction request (curve 56). The engine torque (curve 55) is no longer affected by the TCU torque reduction request.

Figure 6:
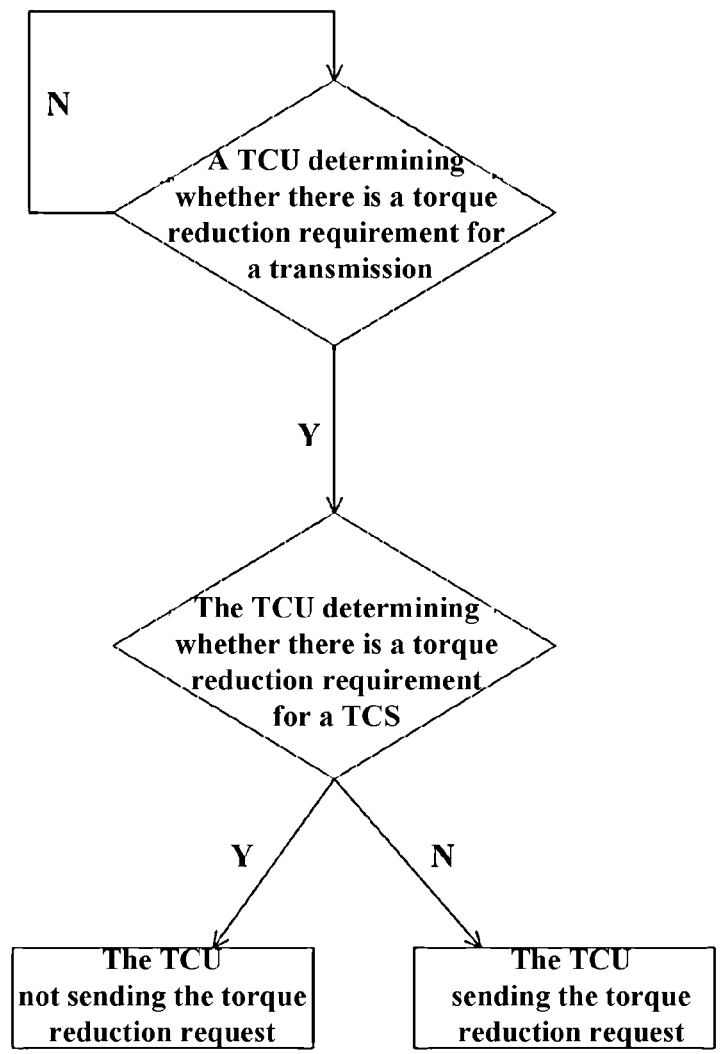
FIG. 6 is a method flowchart of another embodiment of the present invention.

Another method embodiment of the present invention shown in FIG. 6 is based on the following conception: independently responding to the TCS by splitting the ESP torque reduction request signal. The ESP torque reduction request signal is split without splitting the ESP state signal and failed signal:

ESP_ESPTorqueReductionRequestActive: ESP torque reduction request active signal;

ESP_ESPTorqueReductionRequest: ESP torque reduction request signal;

ESP_TCSTorqueReductionRequestActive: TCS torque reduction request active signal;

ESP_TCSTorqueReductionRequest: TCS torque reduction request signal; and the ESP control unit sends the ESP and TCS torque reduction requests respectively. The TCU monitors the TCS torque reduction signal. When determining that the TCS is in the control state when the TCS torque reduction request is activated (ESP_TCSTorqueReductionRequestActive=1), the TCU suspends or cancels the torque reduction request to avoid the interference with the TCS. After the TCS stops sending the torque reduction request (ESP_TCSTorqueReductionRequestActive=0), the TCU can send the torque reduction request according to the control requirements of the transmission.

At this moment, the detection and control step comprises the following steps:

step 1: the TCU determining whether there is a torque reduction requirement for the transmission, and if so, entering step 2, and if not, repeating step 1;

step 2: the TCU determining, depending on whether the torque reduction request signals of the TCS are detected, whether there is a torque reduction request for the TCS, if so, entering step 3, and if not, entering step 4;

step 3: the TCU not sending the torque reduction request; and step 4: the TCU sending the torque reduction request.

Figure 7:
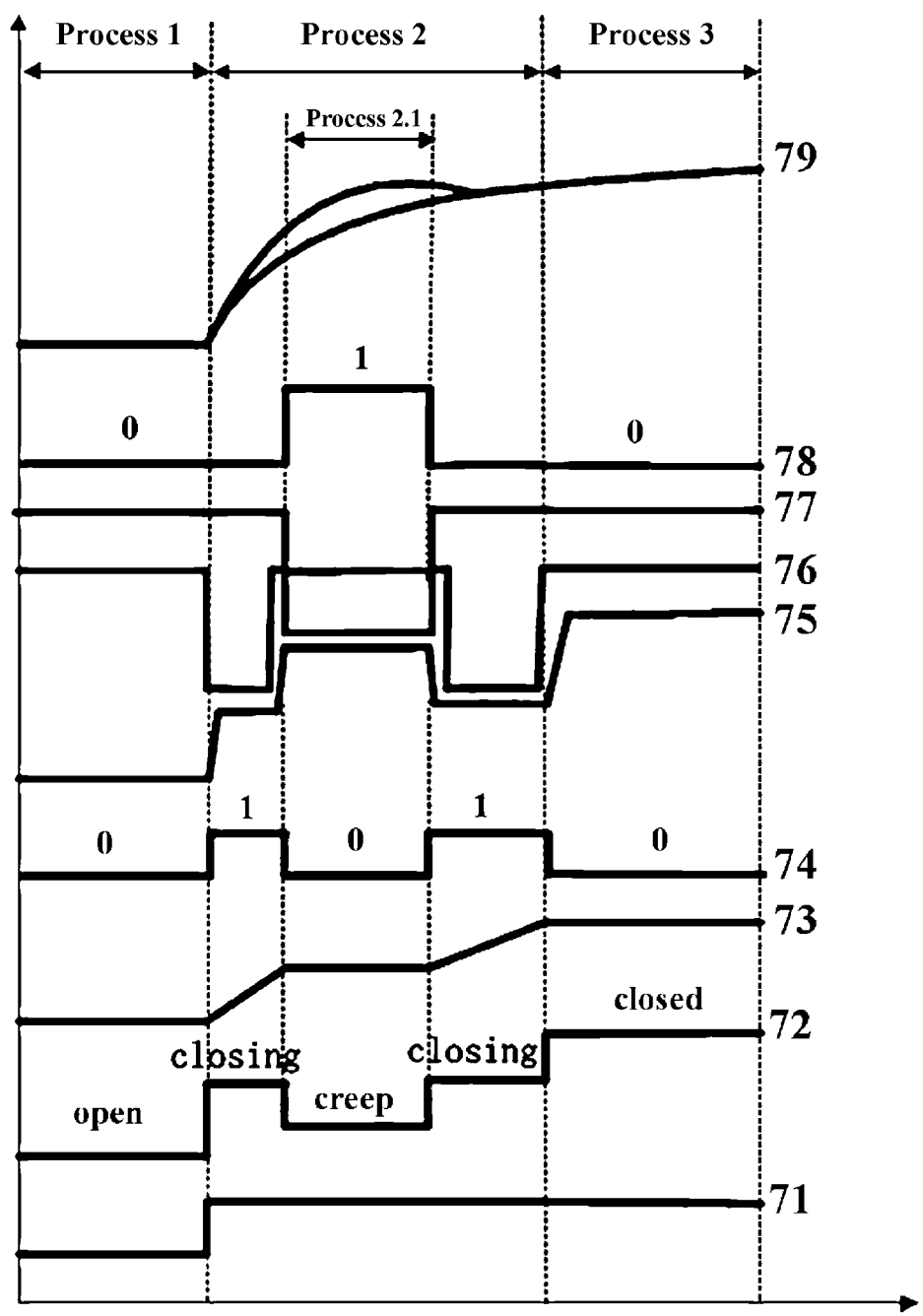
FIG. 7 is a schematic diagram of a starting process of a big throttle on wet road when the method shown in FIG. 6 is applied to a CVT transmission.

FIG. 7 is a schematic diagram of a starting process of a big throttle on wet road when the method shown in FIG. 6 is applied to a CVT transmission, in which:

curve 71: accelerator pedal opening;

curve 72: clutch state, wherein open refers to clutch opening, closing refers to a clutch engagement process, closed refers to clutch engaged, and creep refers to an idling sliding state;

curve 73: clutch pressure;

curve 74: TCU torque reduction request active signal;

curve 75: engine torque;

curve 76: TCU torque reduction request;

curve 77: TCS torque reduction request;

curve 78: TCS state, where 1 indicates active, and 0 indicates inactive; and curve 79: ABS wheel speed signal (a driving wheel and a driven wheel).

As shown in FIG. 7, a starting process of a large throttle of a CVT transmission on wet road is still taken as an example:

process 1: the vehicle keeping standstill on the spot, and the clutch (curve 72) being in an open state (open) at this moment Process 2: the driver presses down an accelerator (curve 71) and the vehicle starts. The clutch pressure increases (curve 73), and the clutch begins to engage (curve 72). At this time, the TCU triggers the torque reduction request active signal (curve 74), and the TCU starts to send the torque reduction request (curve 76). The ECU controls the engine torque (curve 75) according to the TCU torque reduction request. At this moment, due to the slipping of the driving wheel of the vehicle, the speed of the driving wheel begins to be deviated from a rotational speed of the driven wheel.

Process 2.1: when the rotational speed of the driving wheel and the rotational speed of the driven wheel are too high, the TCS operates, the TCS torque reduction request is activated (curve 78, ESP_TCSTorqueReductionRequestActive=1) and the TCS starts to send the torque reduction request (curve 77). When detecting that the TCS torque reduction request is activated, the TCU interrupts the TCU torque reduction request active signal (curve 74), stops sending the TCU torque reduction request (curve 76), suspends the clutch engagement process, and maintains in the creep state (curve 72), thus ensuring that a certain torque is delivered to the wheel. At this moment, the ECU controls the engine torque (curve 75) according to the TCS torque reduction request (curve 77). After process 2.1, the difference of the rotational speeds between the driving wheel and the driven wheel (curve 79) decreases and the TCS torque reduction request is interrupted (Curve 78, ESP_TCSTorqueReductionRequestActive=0). When detecting that the TCS stops sending the torque reduction request, the TCU can continue to activate the TCU torque reduction request (curve 74), send the torque reduction request (curve 76) and continue the clutch engagement process (curve 72).

Process 3: the vehicle continues the acceleration and the clutch completes the engagement (curve 72), and the TCU cancels the torque reduction request active signal (curve 74) and stops sending the torque reduction request (curve 76). The engine torque (curve 75) is no longer affected by the TCU torque reduction request.

It can be seen from the above-mentioned comparison that, the method of the present invention solves the problems of vehicle jitter, vehicle locking, excessively rapid vehicle-speed decreasing, and excessively rapid hardware damage of a clutch by avoiding the problem of mutual interference between the TCU and the TCS.

Up to this, a person skilled in the art should recognize that although a plurality of exemplary embodiments of the present invention have been shown and described in detail herein, numerous other variations or modifications meeting the principle of the present invention can be directly determined or derived according to the contents disclosed in the present invention. Therefore, the scope of the present invention should be construed and considered as covering all of such other variations or modifications.

What is claimed is:

1. A method for preventing interference between a TCU and an ESP integrated with a TCS, characterised in that the method comprises:

a splitting step: splitting signals of the ESP and the TCS, so that the TCU can learn about whether the TCS is in a control state;

and a detection and control step: the TCU independently detecting the splitted signals of the ESP and the TCS, and when detecting that the TCS is in the control state, the TCU suspending the active sending of a torque reduction request of its own to an ECU.

2. The method according to claim 1, characterised in that the control state is a TCS-activated state;
the splitting step comprises: splitting state signals and failed signals of the ESP and the TCS.

3. The method according to claim 1, characterised in that the control state is a TCS torque reduction request-activated state; and
the splitting step comprises: splitting torque reduction request signals of the ESP and the TCS.

4. The method according to claim 2, characterised in that the detection and control step comprises:
when determining that the TCS is activated if detecting the state signals of the TCS, the TCU stopping the sending of the torque reduction request.

5. The method according to claim 4, characterised in that the detection and control step further comprises:
when determining that the ESP fails if detecting the failed signals of the ESP, and determining that the TCS fails if detecting the failed signals of the TCS, the TCU then being able to send the torque reduction request of the TCU according to control requirements of a transmission.

6. The method according to claim 2, characterised in that the detection and control step comprises the following steps:
step 1: the TCU determining whether there is a torque reduction requirement for the transmission, and if so, entering step 2;
step 2: the TCU determining, depending on whether the failed signals of the TCS are detected, whether the TCS fails, if so, entering step 4, and if not, entering step 3;
step 3: the TCU determining, depending on whether the state signals of the TCS are received, whether the TCS is in the TCS-activated state, if not, entering step 4, and if so, the TCU not sending the torque reduction request and returning to step 1; and
step 4: the TCU sending the torque reduction request.

7. The method according to claim 3, characterised in that when determining that the TCS torque reduction request is activated if detecting the torque reduction request signals of the TCS, the TCU suspends the active sending of the torque reduction request of its own to the ECU; and when determining that the TCS torque reduction request is not activated if the torque reduction request signals of the TCS are not detected, the TCU sends the torque reduction request according to the control requirements of the transmission.

8. The method according to claim 3, characterised in that the detection and control step comprises the following steps:
step 1: the TCU determining whether there is a torque reduction requirement for the transmission, if so, entering step 2, and if not, repeating step 1;
step 2: the TCU determining, depending on whether the torque reduction request signals of the TCS are detected, whether there is a torque reduction request for the TCS, if so, entering step 3, and if not, entering step 4;
step 3: the TCU not sending the torque reduction request; and
step 4: the TCU sending the torque reduction request.

9. The method according to claim 1, characterised in that the TCU communicates with the ESP via a CAN bus.

* * * * *